(12) United States Patent
Adolfsson et al.

(10) Patent No.: US 8,844,253 B2
(45) Date of Patent: Sep. 30, 2014

(54) FRONT BAFFLE ASSEMBLY FOR A LAWN MOWER

(75) Inventors: Mikael Adolfsson, Gränna (SE);
Fredrik Edholm, Jönköping (SE);
Helena André, Bankeryd (SE); Magnus Henriksson, Jönköping (SE); Jasmin Insanic, Jönköping (SE); Jörgen Johansson, Jönköping (SE); Jonas Tibbelin, Huskvarna (SE)

(73) Assignee: Husqvarna AB, Huskvarna (SE)

( * ) Notice: Subject to any disclaimer, the term of this patent is extended or adjusted under 35 U.S.C. 154(b) by 0 days.

(21) Appl. No.: 14/122,748

(22) PCT Filed: May 31, 2011

(86) PCT No.: PCT/SE2011/050675
§ 371 (c)(1),
(2), (4) Date: Nov. 27, 2013

(87) PCT Pub. No.: WO2012/166026
PCT Pub. Date: Dec. 6, 2012

(65) Prior Publication Data
US 2014/0109539 A1    Apr. 24, 2014

(51) Int. Cl.
*A01D 67/00*   (2006.01)
*A01D 34/81*   (2006.01)
*B29C 65/58*   (2006.01)

(52) U.S. Cl.
CPC .............. *A01D 34/81* (2013.01); *B29C 65/58* (2013.01)
USPC ...................................... 56/320.1

(58) Field of Classification Search
CPC ... A01D 34/81; A01D 34/4167; A01D 34/63; A01D 34/73; A01D 34/826; A01D 34/828; A01D 2101/00; B60Y 2200/223; F16C 2326/02

USPC .................... 56/320.1, 320.2, 16.9, DIG. 20; 30/275.4, 276
See application file for complete search history.

(56) References Cited

U.S. PATENT DOCUMENTS 2,756,556 A * 7/1956 Watkins ........................ 56/189
3,680,295 A * 8/1972 Rutherford .................. 56/320.2
(Continued)

FOREIGN PATENT DOCUMENTS

EP    0193186 A1    9/1986
EP    1129752 A1    9/2001
(Continued)

OTHER PUBLICATIONS

International Search Report and Written Opinion of PCT/SE2011/050675 mailed Feb. 3, 2012, all enclosed pages cited.
(Continued)

*Primary Examiner* — Árpád Fábián-Kovács
(74) *Attorney, Agent, or Firm* — Nelson Mullins Riley & Scarborough LLP

(57) ABSTRACT

A front baffle assembly (1) for a lawn mower (30) is provided. The front baffle assembly (1) is adapted for attachment to a lawn mower chassis (2), and comprises a stopper (5a, 5b) configured to abut against an upper side of the chassis (2) and a front baffle (4) configured to abut against a lower side of the chassis (2). The front baffle assembly (1) comprises a catch element (6a, 6b) which protrudes downwardly from the stopper (5a, 5b) and is arranged to extend through the chassis (2) and beyond a lower side of the front baffle (4). The front baffle assembly (1) comprises a front axle (7) arranged to be received between the catch element (6a, 6b) and the lower side of the front baffle (4) to clamp the chassis (2) between the stopper (5a, 5b) and the front baffle (4).

13 Claims, 4 Drawing Sheets

(56) References Cited

U.S. PATENT DOCUMENTS

| | | | |
|---|---|---|---|
| 3,807,151 A * | 4/1974 | Rosenthal et al. | 56/16.9 |
| 4,112,656 A * | 9/1978 | Ranko et al. | 56/320.1 |
| 4,422,211 A * | 12/1983 | Chernosky | 15/328 |
| 4,470,219 A | 9/1984 | Sugimoto | |
| 4,711,077 A * | 12/1987 | Kutsukake et al. | 56/320.2 |
| 4,817,372 A * | 4/1989 | Toda et al. | 56/12.8 |
| 5,117,616 A * | 6/1992 | McLane | 56/17.5 |
| 5,314,230 A | 5/1994 | Hutchison et al. | |
| 5,488,821 A * | 2/1996 | McCunn et al. | 56/320.2 |
| 5,884,466 A * | 3/1999 | Willmering et al. | 56/320.1 |
| 6,082,083 A | 7/2000 | Stalpes et al. | |
| 6,378,280 B1 | 4/2002 | Bone et al. | |
| 6,941,739 B1 | 9/2005 | Gliser | |
| 7,146,791 B2 | 12/2006 | Benway et al. | |
| 7,171,799 B2 * | 2/2007 | Takeishi et al. | 56/320.1 |
| 7,216,471 B1 * | 5/2007 | Hassan | 56/12.7 |
| 7,302,791 B2 * | 12/2007 | Plouraboue et al. | 56/202 |
| 7,305,813 B2 * | 12/2007 | Plouraboue et al. | 56/320.2 |
| 7,741,793 B2 | 6/2010 | Lucas et al. | |
| 8,037,669 B2 * | 10/2011 | Hansen et al. | 56/320.2 |
| 8,127,522 B2 * | 3/2012 | Campbell | 56/320.2 |
| 8,464,507 B2 * | 6/2013 | Iida et al. | 56/320.1 |
| 2003/0182919 A1 | 10/2003 | Baumann et al. | |
| 2006/0042218 A1 * | 3/2006 | Plouraboue et al. | 56/320.2 |
| 2006/0042219 A1 * | 3/2006 | Takeishi et al. | 56/320.2 |
| 2008/0072555 A1 | 3/2008 | Samejima et al. | |
| 2009/0183481 A1 | 7/2009 | Lancaster et al. | |
| 2010/0269474 A1 * | 10/2010 | Hansen et al. | 56/16.7 |
| 2013/0291506 A1 * | 11/2013 | Johnson et al. | 56/12.8 |

FOREIGN PATENT DOCUMENTS

| | | | | |
|---|---|---|---|---|
| EP | 1183937 A1 | 3/2002 | | |
| EP | 1637028 A1 | 3/2006 | | |
| EP | 1647177 A1 | 4/2006 | | |
| EP | 1749431 A1 | 2/2007 | | |
| GB | 1281310 A | 7/1972 | | |
| GB | 2028085 A * | 3/1980 | | A01D 35/26 |
| GB | 2494244 A * | 3/2013 | | A01D 34/74 |

OTHER PUBLICATIONS

Mountfield SP470 Petrol Lawnmower, printed from http://www.greenstripe.net/Parts-diagram/Diagram-318_Page-1.aspx on Nov. 4, 2010, all enclosed pages cited.

Toro 22 inch Recycler Lawn Mower Parts Catalog (Form No. 3360-859 Rev A) for Model No. 20331C-290000001 and up, printed from http://toro.com/home/mowers/recycler/20331.html on Nov. 4, 2010, all enclosed pages cited.

Oscar Wilson model No. 96144000100, printed from http://www.oscar-wilson.com/manuals/ayp/96144000100.pdf on Nov. 4, 2010, all enclosed pages cited.

* cited by examiner

FRONT BAFFLE ASSEMBLY FOR A LAWN MOWER

TECHNICAL FIELD

Embodiments herein relate to a front baffle assembly for a lawn mower, and to a lawn mower comprising a front baffle assembly. Embodiments herein further relate to a method for attaching a front baffle assembly to a lawn mower chassis.

BACKGROUND

A walk behind lawn mower comprises a chassis onto which wheels, a handle, and a rotating cutting blade are arranged. If the lawn mower is motor driven, it comprises an engine which is arranged to rotate the cutting blade and for drive one or more of the lawn mower wheels.

The cutting blade is arranged under the chassis in a cylindrical volume under a protective hood which is integrated in, or form a separate part of, the chassis. The hood, or the volume defined by it, is sometimes referred to as a cutting deck, or a "dough nut" due to its shape.

Normally, a so called front baffle is arranged under chassis, to provide a front wall for the cylindrical volume wherein the cutting blade is arranged.

A problem is that mounting of the front baffle to the lawn mower chassis usually comprises welding operations and fasting of several fasteners such as e.g. screws. This is both time-consuming and costly.

Furthermore, the lawn mower may comprise a front cover. The front cover is then arranged on top of the chassis, as for example a design feature.

Fastening of the front cover then further adds to the number of fasteners and/or welding operations required during assembly of the lawn mower.

Fasteners may increase the risk of water penetration and render cleaning of the lawn mower difficult.

SUMMARY

In view of the discussion above, it is an object for embodiments herein to provide an improved front baffle assembly for a lawn mower.

According to a first aspect, the object is achieved by a front baffle assembly for a lawn mower. The front baffle assembly is adapted for attachment to a lawn mower chassis. The front baffle assembly comprises a stopper configured to abut against an upper side of the lawn mower chassis. The front baffle assembly further comprises a front baffle configured to abut against a lower side of the lawn mower chassis so as to sandwich a portion of the chassis between the stopper and the front baffle. The front baffle assembly further comprises a catch element. The catch element protrudes downwardly from the stopper and is arranged to extend through the lawn mower chassis and beyond a lower side of the front baffle. The front baffle assembly further comprises a front axle configured to extend in an axial direction. The front axle is further arranged to be received between the catch element and the lower side of the front baffle to clamp the lawn mower chassis between the stopper and the front baffle.

By "abut against" is understood "lie alongside". This does not exclude the possibility of a brick, a plate or the like being present between the parts that abut against each other.

In some embodiments, the catch element forms an integrated part of the stopper.

In some embodiments, the stopper is a front cover of the lawn mower. This may be advantageous since it provides efficient fastening of a front cover to the chassis without using additional fasteners such as screws or the like.

In some embodiments, the catch element is represented by at least two catch elements which are separated in the axial direction. This may add stability to the arrangement.

In some embodiments, the catch element and the front baffle further comprise respective complementary guide elements adapted for mutual engagement.

This may facilitate the assembling of the parts to each other, and add stability to the assembly.

In some embodiments, the catch element is arranged to receive the front axle by snap locking. This provides efficient and fast assembly of the front axle assembly.

According to a second aspect, a lawn mower comprising a front baffle assembly according to embodiments herein is provided.

According to a third aspect, a method for attaching a front baffle assembly to a lawn mower chassis is provided. The method comprises abutting a stopper to an upper side of the lawn mower chassis such that a catch element thereof protrudes downwardly from the stopper. A front baffle is then abutted to a lower side of the lawn mower chassis such that the catch element protruding from the stopper extends through the lawn mower chassis and beyond a lower side of the front baffle. A front axle is then received between the catch element and the lower side of the front baffle to clamp the lawn mower chassis between the front cover and the front baffle.

In some embodiments, the catch element and the front baffle further comprise respective complementary guide elements adapted for mutual engagement. The method may then further comprise guiding the respective complementary guide elements into mutual engagement.

In some embodiments, the front axle is received in the catch element by snap locking.

Thanks to the chassis being sandwiched between the stopper and the front baffle, and clamped between them by the front axle being received in the catch element which protrudes from the stopper, the whole front baffle assembly can be efficiently attached to the chassis without time-consuming operations such as welding. This provides an efficient way of attaching both the front baffle and the front axle to the chassis.

Embodiments herein hence provide an improved baffle assembly for a lawn mower.

Since the front baffle assembly is locked to the lawn mower chassis by the front axle, the number of fasteners and assembling operations is reduced. This provides a cost efficient and fast assembly of the lawn mower.

Moreover, thanks to embodiments herein, several chassis can be efficiently stacked on top of each other before assembly of the lawn mower. This is thanks to the volume configured to receive the front baffle being empty before the assembly of the front baffle together with the front axle, and possibly a front cover, to the chassis.

This reduces costs related to transport and/or storing of the parts before assembly.

Other objects, advantages and novel features of embodiments herein will become apparent from the following detailed description when considered in conjunction with the accompanying drawings and claims.

DETAILED DESCRIPTION

Embodiments herein may be exemplified in the following non-limiting description of embodiments.

Figure 1:
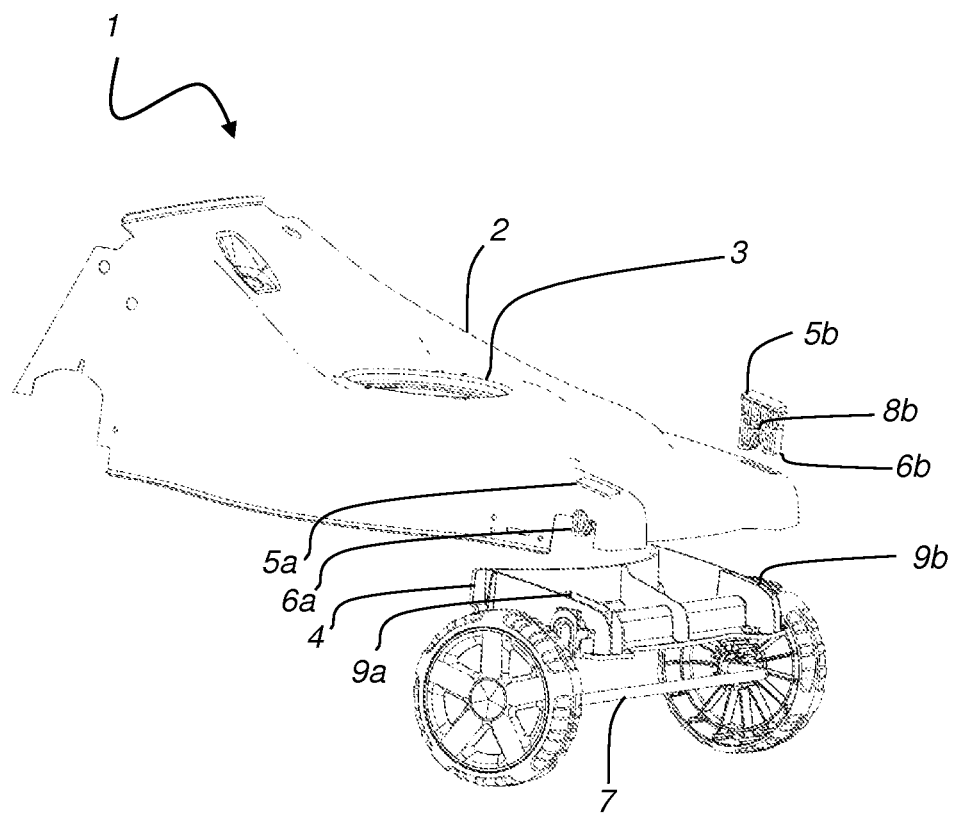
FIG. 1 is a schematic exploded view of a front baffle assembly according to some embodiments herein.

FIG. 1 schematically illustrates a front baffle assembly 1 in an exploded view. It is to be understood that the exploded view is merely chosen as a way of disclosing the parts of the front baffle assembly in a clear way.

The front baffle assembly 1 is configured for attachment to a lawn mower chassis 2. The lawn mower chassis 2 is a structural frame of a lawn mower onto which other parts such as a handle and wheel axles etc., of the lawn mower are attached. In the depicted embodiment, a cutting deck 3 forms an integrated part of the lawn mower chassis 2. In another embodiment, the cutting deck 3 may be a separate part.

The front baffle assembly 1 comprises a front baffle 4. The front baffle 4 is arranged under a front part of the chassis 2, and configured to abut a lower side of the chassis 2.

The front baffle assembly 1 further comprises a stopper 5a, 5b, arranged to abut an upper side of the chassis 2. The stopper 5a, 5b is in this embodiment represented by two stoppers 5a, 5b. The stopper 5a is shown in a mounted position where it abuts the upper side of the chassis 2. The other stopper 5b is shown above the chassis 2, to fully disclose its structure.

The front baffle assembly 1 further comprises a catch element 6a, 6b. The catch element 6a, 6b protrudes downwardly from the stopper 5a, 5b. In the present example, the catch element is represented by two catch elements, wherein each one protrudes downwardly from a respective stopper, such that the catch element 6a protrudes downwardly from the stopper 5a, and the catch element 6b protrudes downwardly from the stopper 5b. The catch element 6a, 6b may form an integrated part of the stopper 5a, 5b.

In some embodiments, there may be one stopper and one catch element. In another embodiment, there may be three or more stoppers and three or more catch elements.

The front baffle assembly 1 further comprises a front axle 7. The front axle may, as in the depicted embodiment, be a wheel axle. In another embodiment, the front axle may be a transversal rod which is separate from one or more wheel axles.

When the front baffle assembly 1 is attached to the lawn mower chassis 2, the stoppers 5a, 5b abut the upper side of the lawn mower chassis 2 and the front baffle 4 abuts a lower side of the lawn mower chassis 2 such as to sandwich the lawn mower chassis 2 between them.

The catch elements 6a, 6b then protrude beyond the front baffle 4. The front axle 7 is received between the catch element 6a, 6b and the front baffle 4, to clamp the lawn mower chassis 2 between the stopper 5a, 5b and the front baffle 4.

This way, the front baffle 4 is locked to the lawn mower chassis 2 by the front axle. Hence, an efficient fastening of both the front axle 7 and the front baffle 4 to the lawn mower chassis 2 is provided.

As can be seen in FIG. 1, the catch element 6a, 6b may further comprise openings 8a, 8b (8a not shown), in which the front axle 7 is received by snap locking.

This provides a fast and efficient assembly of the front baffle assembly 1.

The catch element 6a, 6b and the front baffle 4 depicted, by way of example, in FIG. 1 further comprise respective complementary guide elements 9a, 9b adapted for mutual engagement.

In FIG. 1, each guide element is represented by a respective recess 9a, 9b configured to receive the catch element 6a, 6b and holding it in place.

The guide elements 9a, 9b facilitates assembly of, and adds stability to, the front baffle assembly 1.

Figure 2:
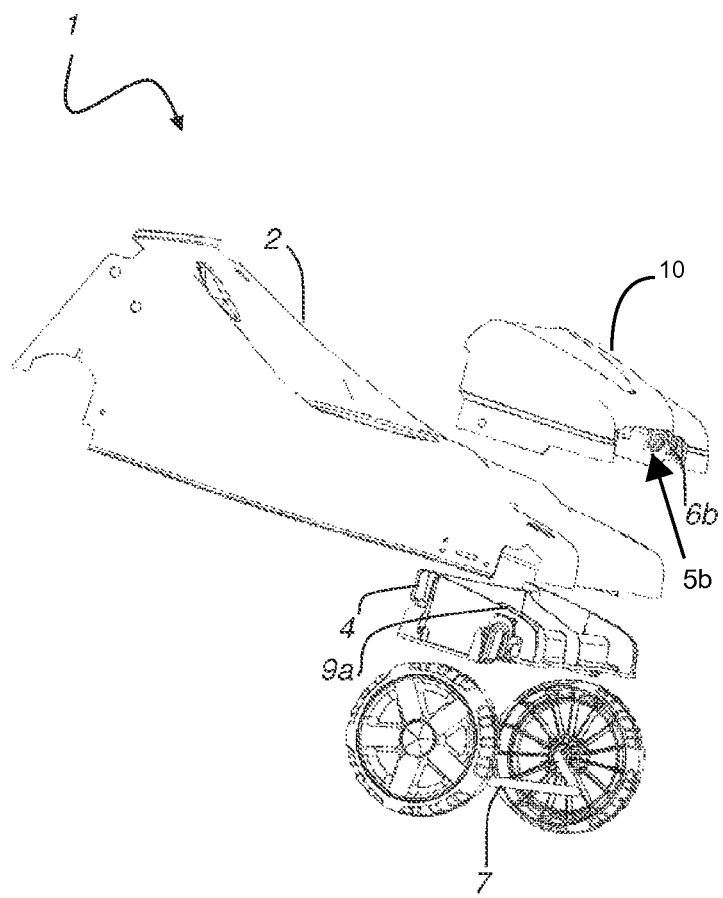
FIG. 2 is a schematic exploded view of a front baffle assembly according to some embodiments herein.

FIG. 2 illustrates further embodiments of the front baffle assembly 1.

As shown in this figure, the stopper 5a, 5b may form an integrated part with a front cover 10. This provides efficient fastening of a front cover 10 to the lawn mower chassis 2 without the need for additional fasteners, and/or welding.

In some embodiments, one, two or more catch elements as previously described in relation to FIG. 1 may be integrated with the front cover.

Figure 3:
FIG. 3 is a schematic illustration of a lawn mower comprising a front baffle assembly according to some embodiments herein.

FIG. 3 illustrates a lawn mower 30 comprising a front baffle assembly according to some embodiments herein.

Figure 4:
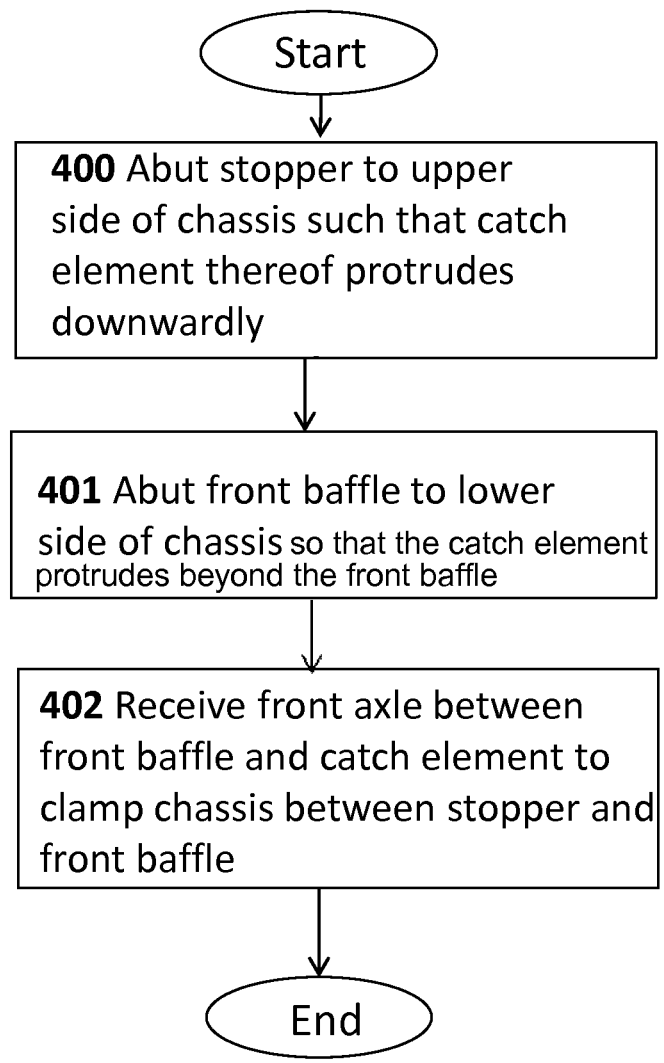
FIG. 4 is a block diagram illustrating a method according to embodiments herein.

FIG. 4 illustrates a method for attaching the front baffle assembly 1 to a lawn mower chassis 2. The method comprises the following actions, which may in other embodiments be taken in another suitable order.

Action 400

The stopper 5a, 5b is abutted to an upper side of the lawn mower chassis 2 such that the catch element 6a, 6b thereof protrudes downwardly from the stopper 5a, 5b.

Action 401

The front baffle 4 is abutted to a lower side of the lawn mower chassis 2, such that the catch element 6a, 6b protruding from the stopper 5a, 5b extends through the lawn mower chassis 2 and beyond a lower side of the front baffle.

Action 402

The front axle 7 is received between the catch element 6a, 6b and the lower side of the front baffle 4 to clamp the lawn mower chassis 2 between the stopper 5a, 5b and the front baffle 4.

In some embodiments, the front axle 7 is received in the catch element 6a, 6b by snap locking.

In some embodiments, according to which the catch element 5a, 5b and the front baffle 4 further comprise respective complementary guide elements 9a, 9b adapted for mutual engagement, the method may further comprise guiding the guide elements 9a, 9b into mutual engagement.

Thanks to embodiments herein, fast and efficient fastening of a front baffle assembly to a lawn mower chassis is provided.

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention, which is defined by the appending claims.

The invention claimed is:

1. A front baffle assembly for a lawn mower, wherein the lawn mower comprises a chassis, the front baffle assembly comprising:
   a stopper abutting against an upper side of the chassis,
   a front baffle abutting against a lower side of the chassis so as to sandwich a portion of the chassis between the stopper and the front baffle, a catch element protruding downwardly from the stopper and extending through both the chassis and the front baffle so that the catch element extends beyond a lower side of the front baffle, and a front axle extending in an axial direction and received between the catch element and the lower side of the front baffle so that the portion of the chassis is disposed between the stopper and the front baffle and clamped therebetween.

2. The front baffle assembly according to claim 1, wherein the catch element forms an integrated part of the stopper.

3. The front baffle assembly according to claim 1, wherein the stopper forms an integrated part of a front cover of the lawn mower.

4. The front baffle assembly according to claim 1, wherein the catch element is represented by at least two catch elements which are separated in the axial direction.

5. The front baffle assembly according to claim 1, the front baffle further comprising a guide element in the form of a recess therethrough that slidably receives the catch element.

6. The front baffle assembly according to claim 1, wherein the catch element receives the front axle in a snap lock.

7. A lawn mower comprising:
   a chassis; and
   a front baffle assembly, wherein the front baffle assembly comprises:
      a stopper abutting against an upper side of the chassis,
      a front baffle abutting against a lower side of the chassis so that a portion of the chassis is sandwiched between the stopper and the front baffle,
      a catch element protruding downwardly from the stopper and extending through both the chassis and a recess of the front baffle so that the catch element extends beyond a lower side of the front baffle, and
      a front axle extending in an axial direction and received between the catch element and the lower side of the front baffle so that the portion of the chassis is disposed between the stopper and the front baffle.

8. The lawn mower according to claim 7, wherein the catch element forms an integrated part of the stopper.

9. The lawn mower according to claim 7, wherein the stopper forms an integrated part of a front cover of the lawn mower.

10. The lawn mower according to claim 7, wherein the catch element is represented by at least two catch elements which are separated in the axial direction.

11. The lawn mower according to claim 7, wherein the catch element receives the front axle in a snap.

12. A method for attaching a front baffle assembly to a lawn mower chassis, the method comprising:
   abutting a stopper to an upper side of the lawn mower chassis such that a catch element thereof protrudes downwardly from the stopper,
   abutting a front baffle to a lower side of the lawn mower chassis, such that the catch element protruding from the stopper extends through both the lawn mower chassis and the front baffle so that the catch element extends beyond a lower side of the front baffle, and
   receiving a front axle between the catch element and the lower side of the front baffle to clamp the lawn mower chassis between the stopper and the front baffle.

13. The method according to claim 12, wherein the front axle is received in the catch element by snap locking.

* * * * *

UNITED STATES PATENT AND TRADEMARK OFFICE
CERTIFICATE OF CORRECTION

| | | |
|---|---|---|
| PATENT NO. | : 8,844,253 B2 | Page 1 of 1 |
| APPLICATION NO. | : 14/122748 | |
| DATED | : September 30, 2014 | |
| INVENTOR(S) | : Mikael Adolfsson et al. | |

It is certified that error appears in the above-identified patent and that said Letters Patent is hereby corrected as shown below:

IN THE CLAIMS:

Column 6, Claim No. 11, Line 16 "catch element receives the front axle in a snap." should read
--catch element receives the front axle in a snap lock.--.

Signed and Sealed this
Twenty-seventh Day of January, 2015

Michelle K. Lee
*Deputy Director of the United States Patent and Trademark Office*